Oct. 20, 1959 C. K. STEDMAN 2,909,364
ACOUSTIC DAMPER
Filed Oct. 11, 1956 6 Sheets-Sheet 1

INVENTOR.
CECIL K. STEDMAN
By Philip Subkow
ATTORNEY.

INVENTOR,
CECIL K. STEDMAN
BY
ATTORNEY.

Fig. 11.

Oct. 20, 1959     C. K. STEDMAN     2,909,364
ACOUSTIC DAMPER Filed Oct. 11, 1956     6 Sheets-Sheet 6

INVENTOR,
CECIL K. STEDMAN

United States Patent Office 2,909,364
Patented Oct. 20, 1959

2,909,364

ACOUSTIC DAMPER

Cecil K. Stedman, Enumclaw, Wash., assignor to Statham Instruments, Inc., Los Angeles, Calif., a corporation of California Application October 11, 1956, Serial No. 615,397

35 Claims. (Cl. 264—1)

Methods for damping the oscillations of a mechanical system have heretofore been suggested which employ dash pots to compress air in a chamber and force the same through an orifice, and exhaust the air into the atmosphere or some relatively large chamber. The vibrating system to be damped is connected to some means for displacing air in a chamber, thus compressing the air and forcing it to flow through the orifice. This invention relates to improvements in such damping devices which make possible their application to mechanical systems which could not otherwise be damped effectively. This is accomplished by the use of orifices so designed that they meet certain critical requirements.

In my invention the compressing member may be a displaceable wall of the chamber, i.e., a flexible diaphragm or a rigid piston. The diaphragm or piston is connected to the vibrating system and thus transmits the vibrations to air or other gas in the chamber to generate acoustic energy at the frequency of the vibrating system and to force the gas through the single or multiple orifices. For convenience of description, I will refer to the chamber as the "damping chamber," the compressing means as the "diaphragm."

I have found that if the orifice consists of a single opening, of whatever shape, there is an upper limit to the permissible size of the opening, that limit being smaller the higher the frequency of the instrument to be damped. For example, in the case of a circular opening, the radius ($r$) must be less than the square root of the kinematic viscosity of the gas ($\nu$) divided by frequency ($f$).

$$r^2 < \frac{\nu}{f} \qquad (1)$$

If this relationship is violated the inertia of the gas in the opening becomes large in proportion to the viscous drag. Then the orifice no longer acts as an effective damper, the flow resistance varies with frequency instead of remaining substantially constant as desired, and the flow may become turbulent.

While the foregoing considerations fix an upper limit to the size of the orifice, a lower limit is set by the fact that optimum damping of the mechanical system dictates a specific rate of flow of gas through the orifice per unit pressure in the chamber (hereafter referred to as the flow resistance of the orifice). If the characteristics of the mechanical system happen to be such that the lower limit so established is less than the aforementioned upper limit, it will be possible to achieve optimum damping of that instrument by means of a single orifice. However, that represents a special case of limited applicability. In general, the two limits on the size of the orifice are incompatible with each other and it is impossible to achieve optimum damping with a single orifice.

I have found that the limitations described above can be overcome by the use of a foraminated diaphragm in place of the orifice. This diaphragm will hereinafter be referred to as the porous plug. Such plugs may be porous diaphragms formed by sintering or otherwise cementing small particles, as for example by powdered metal techniques. They may also be perforated plates.

It is the purpose of this invention to damp a vibrating mechanical system by employing an acoustic chamber vented through a porous plug into the atmosphere or into a chamber hereafter referred to as the terminal chamber in such a way that the plug provides substantially pure resistance damping. The terminal chamber is of such size and design that the pressure therein on compression of the gas in the damping chamber, is so small as to be insignificant and create substantially no back loading on the porous plug. This makes it possible, in the systems of my invention, for the plug by itself to contribute in an insignificant degree either to the stiffness or to the mass of the acoustically damped vibrating system. This is a desirable result, because the acoustic stiffness or acoustic mass of a porous material varies rapidly with frequency. If such a varying reactance is added to the constant mass and stiffness of the vibrating system, the frequency response will be adversely affected. In particular the frequency at which the response first deviates sensibly from the response at zero frequency, will be lower than would otherwise be the case.

This invention will be further described in connection with the drawings, of which.

In order to provide essentially pure damping I have discovered that the design of the plug or porous plugs, where more than one used, must conform to two critical relationships. First, the porous material should satisfy a criterion which can be expressed mathematically in the statement that the following ratio should be much greater than one:

$$\frac{R_1}{\rho_0 k \omega} \gg 1 \qquad (2)$$

where $R_1$ represents the specific flow resistance per unit length of the plug material, $k$ the structure factor of the material, $\rho_0$ the density of the gas in the plug, which is the same as in the damping chamber, and $\omega$ is the frequency in radians per second, i.e. equal to $2\pi f_n$ where $f_n$ is the frequency in cycles per second. This ratio 2 is usefully 5 to 10 or more, and I prefer to use a value of 10 or more for best results.

I have also found that an additional requirement that must be met is that the length $l$ of the plug or each of the plugs, if more than one is used, measured in the direction of flow of gas bears a critical relation to the attenuation constant "$a$" of the plug material measured at the natural frequency such that their product for each of the plugs should be greater than zero and not greater, i.e., equal to or less, than a critical upper limit ($k_1$). This relation is expressed by the equation $$al \leq k_1 \quad (3)$$

Figure 12:
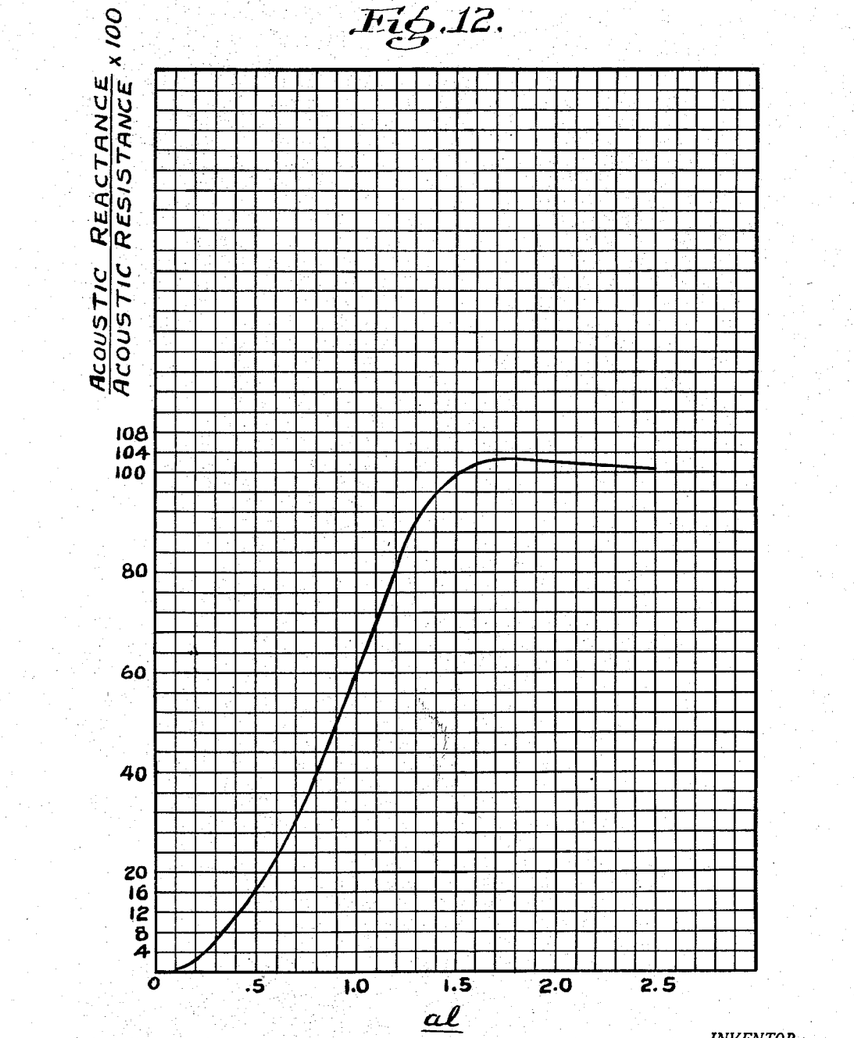
Fig. 12 is a chart corresponding to Table 1 as hereinafter described.

For plugs of uniform cross sectional area when $al=0.30$ ($a$ and $l$ being expressed in centimeter-gram-seconds i.e., c.g.s. units) the acoustic reactance of the plug is 6½% of the acoustic resistance of the plug. A somewhat larger percentage might be tolerated, depending upon the flatness of the frequency response curve required for a particular application. However to obtain the benefits of my invention I desire to limit the acoustic reactance of the acoustic system to be substantially less than the acoustic resistance and a value of $k_1$ of about 1.5 would not be consistent with the purpose of this invention and preferably the value of $k_1$ should be less than 0.5. Fig. 12 is a curve showing the effect, for plugs of uniform cross sectional area, of the value of the factor $al$ on the ratio of the reactance to the resistance expressed as a percentage, measured at the natural frequency. The values from which the curve was constructed are given in Table I:

Table I

| $al$ | Percent $\left(\dfrac{\text{Reactance}}{\text{Resistance}} \times 100\right)$ |
| --- | --- |
| .2 | 2.5 |
| .3 | 6.5 |
| .4 | 11.0 |
| .5 | 17.0 |
| .8 | 40 |
| 1.0 | 61 |
| 1.2 | 80 |
| 1.5 | 100 |
| 1.75 | 103 |
| 2.10 | 102 |
| 2.5 | 101 |

As the value of the product "$al$" increases, the value of the reactance component of the total resistance increases. Thus, as will be observed from the above table, when the value of $k_1$ is equal to 0.2, the reactance component of the resistance is equal to 2.5% of the resistance. When the value of the parameter $k_1$ is equal to 0.5, the reactance forms 17% of the resistance. When the value of $k_1$ is 0.8 the reactance forms 40% of the resistance.

The ratio of the acoustic reactance to the acoustic impedance increases as the value of $al$ increases. Preferably I choose a value of $l$ such that the ratio of acoustic reactance to acoustic resistance is less than one. The smaller the value of $al$ the flatter is the frequency response curve of the damped system. If the value of $al$ is excessive due to the use of a plug of length greater than the optimum length for a given value of "$a$" or by choosing an unsuitably high value of "$a$" for a plug of chosen length, the frequency response curve shows an undesirable "droop" at low frequencies.

The structure factor $k_1$, porosity factor Y and attenuation constant $a$, which is the real part of the complex propagation constant $a+jb$ (where $j=\sqrt{-1}$) are quantities familiar to those skilled in the acoustic art. For a precise definition of the quantity $a$ and the complex function $a+jb$ and of the acoustic reactance and resistance and porosity factor and description of means by which they can be measured, see "Acoustic Measurements" by Beranek, published by John Wiley and Sons, pages 351, etc., 840, etc., 857, etc. In the same work page 844 means for measuring $R_1$ for porous materials are described.

The value of the product $al$ may be fixed either by choosing a material of desired value of $a$ or by employing a plug or plugs of required length $l$, or by adjusting the value of both parameters. When the condition expressed by Equation 2 is satisfied, and for plugs with a porosity factor Y equal to one-half $a$ can be represented by $$a^2 = \frac{\omega R_1}{4p} \quad (4)$$

where $p$ is the average ambient pressure in the damping chamber.

For plugs of non-uniform cross-sectional area, i.e., those whose cross-sectional area changes along their length, a corresponding table may be constructed by measuring the acoustic reactance and acoustic resistance for plugs of different lengths but of the same geometry. In this manner a length may be chosen for each shape of plug such that the acoustic reactance is sufficiently low in comparison with the acoustic resistance so that the frequency response curve does not show an unwanted low frequency droop, for example, by making the acoustic reactance less than about 20% of the acoustic resistance.

If the conditions outlined above are complied with I have found that the acoustic impedance $Zp$ of the porous plug is substantially equal to $R_1 l$. By so choosing the characteristics of the plug I not only achieve a damping effect free from unwanted stiffness or inertial effects, but also one which may be made substantially independent of frequency.

To illustrate the application of the above principle, reference may be had to Figs. 1 to 7 which illustrate forms of transducers dampened according to my invention. This description is not to be taken as any limitation of the nature of my invention but is given to illustrate my invention and constitutes for the forms illustrated and the transducers described a preferred mode of application of the generic invention herein described and claimed.

Figure 1:
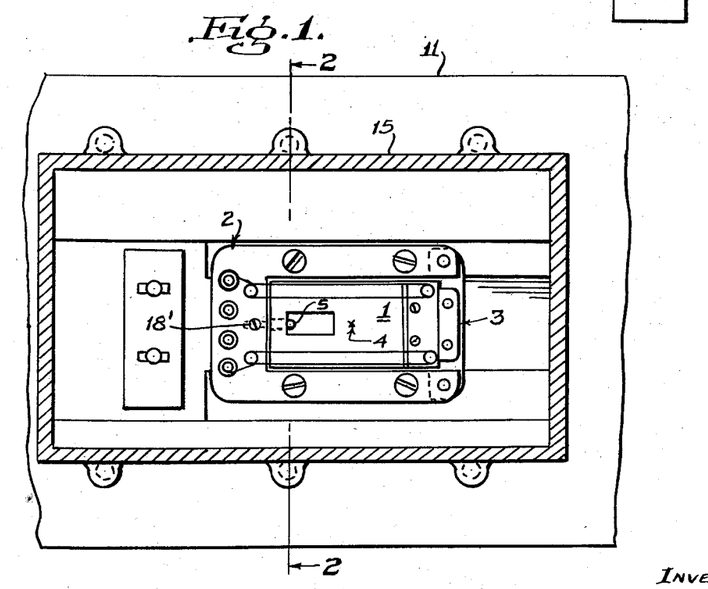
Fig. 1 is a section of one form of my invention taken on line 1—1 of Fig. 2.
Figure 2:
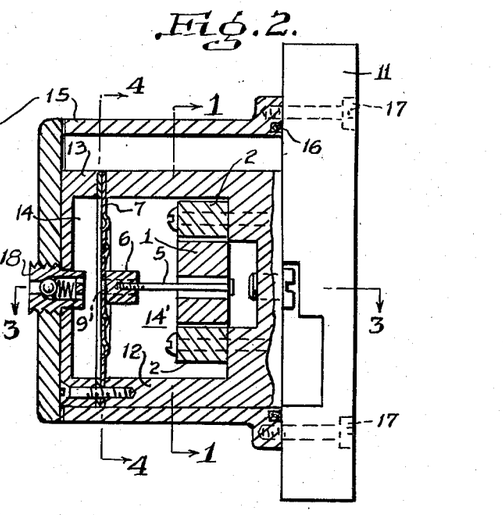
Fig. 2 is a section on line 2—2 of Fig. 1.
Figure 3:
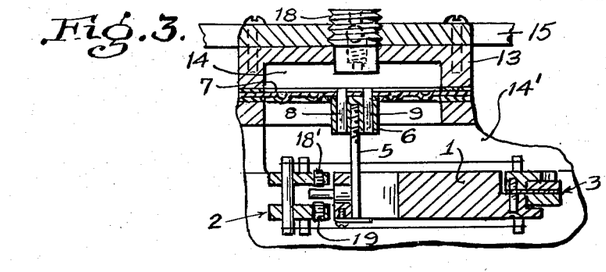
Fig. 3 is a fragmentary section on line 3—3 of Fig. 2.
Figure 4:
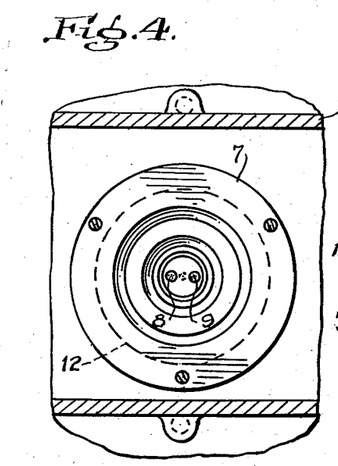
Fig. 4 is a fragmentary section on line 4—4 of Fig. 2.

In the transducer of Fig. 1 the vibrating mass is so related to the diaphragm that the magnitude of motion of the diaphragm is a multiple or fraction of the motion of the center of mass of a vibrating mass to be damped, i.e., that the lever ratio between the mass to be damped and the diaphragm is not unity.

The form shown in Fig. 1 shows a specific application of my invention to an accelerometer in which the sensing system is a strain gage illustrated and described in the Statham U.S. Letters Patent No. 2,453,548.

In Fig. 1 the mass 1 is connected at one end to a flat spring 3 which is clamped to the frame 2 and the mass so that the mass is hingedly mounted about a line of bending of the flat spring. The center of mass of the inertial mass to be damped is indicated at 4. The mass is connected via a centrally positioned rod 5 to a cylindrical boss 6 concentrically connected to a flexible metallic diaphragm 7. The center of mass 4 is, as shown, positioned between the line of bending and the point of attachment of the rod 5 to the mass 1. As will be described below, the rod may be attached to the mass between the center of mass and the line of bending. Where the lever ratio is to be set at unity, the rod may be connected at the center of mass. The boss carries two cylindrical porous plugs 8 and 9, made of the same material and of equal length. The diaphragm is clamped at its edges to a cylindrical flange 12 of base 11 on which the frame 2 is mounted. The diaphragm is clamped by a cap 13 to the flange 12 to form a sealed damping chamber 14. The entire assembly is covered with a casing 15 which makes a fluid-tight fit with the base 11 by means of a gasket 16 and by means of screws 17. The damping chamber 14 communicates with terminal chamber 14' in the interior of the casing 15 via the porous plugs 8 and 9 and chambers 14 and 14' may be placed under any desired pressure through suitable pressuring valve 18.

The oscillation of the mass 1 on the spring 3 is transmitted to the diaphragm 7 which causes an alternate compression and rarification of the gas in chamber 14, causing the gas to flow back and forth through the porous plugs 8 and 9 to and from chamber 14'. This vibration is damped acoustically, as is described herein. The maximum excursion of the mass 1 which is permissible and the maximum change in volume is fixed by setting the stops 18' and 19.

Figure 5:
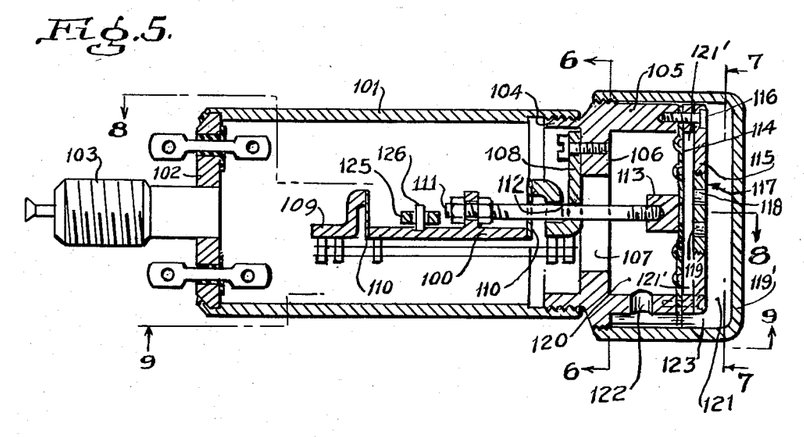
Fig. 5 is a section on line 5—5 of Fig. 6 of one other form of my invention.
Figure 6:
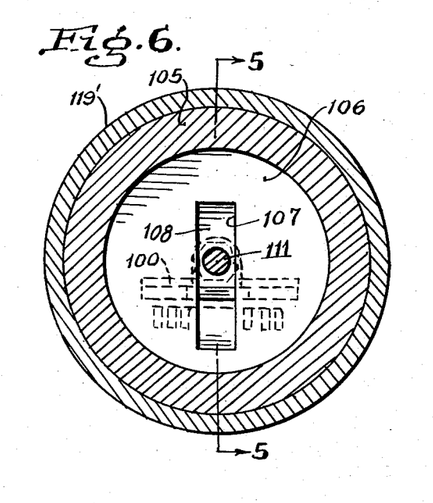
Fig. 6 is a section on line 6—6 of Fig. 5.
Figure 7:
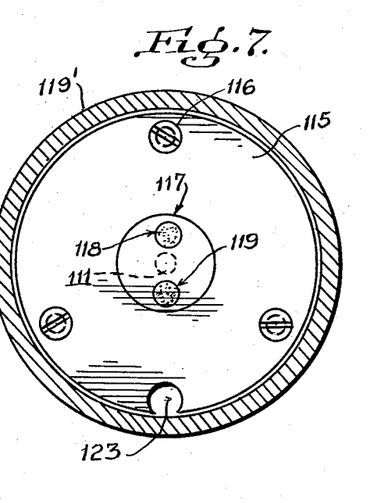
Fig. 7 is a section on line 7—7 of Fig. 5.
Figure 8:
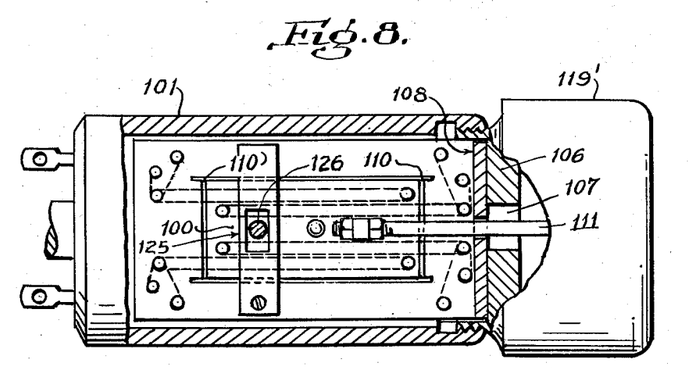
Fig. 8 is a section on line 8—8 of Fig. 5.

Fig. 5 illustrates another application of my invention in which the lever ratio is equal to one.

In this figure the case 101 of an accelerometer has mounted at one end, a pressure-tight cap 102 to which an inlet 103 is connected. The other end of the case 101 is connected to the cylindrical flange 104 mounted on the ring 105 carrying an internal shoulder 106 with a central bore 107. To the shoulder 106 is connected the bracket 108 which carries frame 109 having a central opening in which the rectangular mass 100 is mounted on two flat springs 110. Mounted in the mass and frame are insulated pins over which are wound strain wires in a construction similar to the construction shown in Statham et al. Patent No. 2,573,286.

Figure 13:
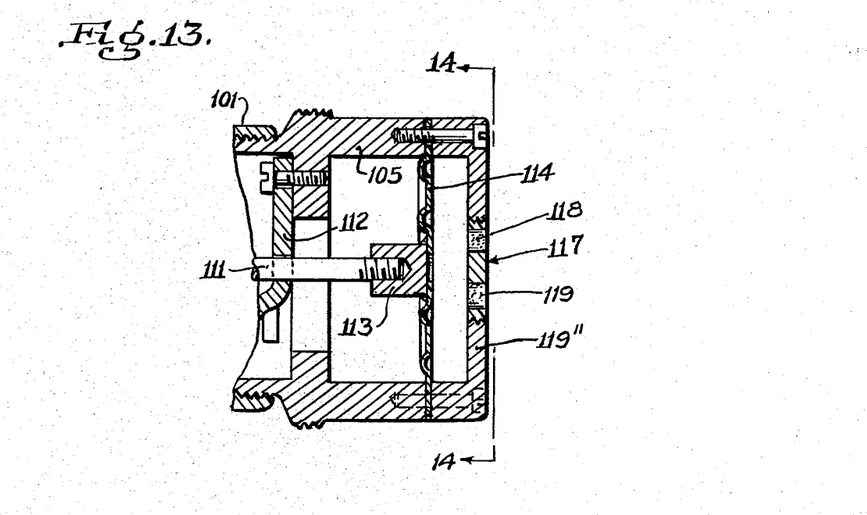
Fig. 13 is a section of another form of the invention.
Figure 14:
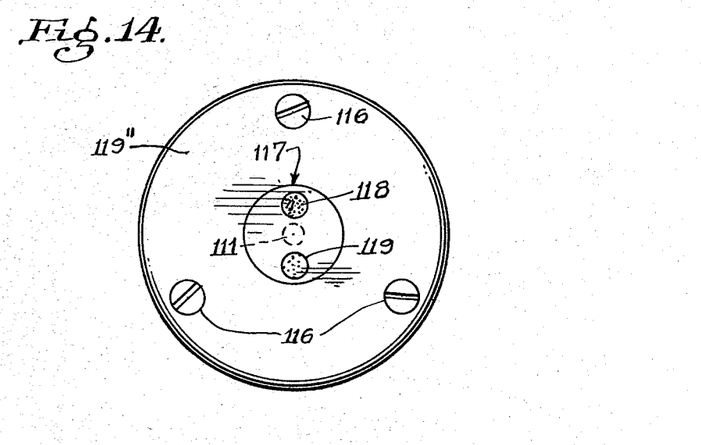
Fig. 14 is a view on line 14—14 of Fig. 13.

The mass 100 is connected by means of a rod 111 passing through an opening 112 in the bracket 108 and is connected to the cylindrical boss 113, which is in turn connected to a flexible metallic diaphragm 114 clamped at its edges to the ring 105 by means of the cap 115 via studs 116. Centrally positioned by the cap 115 is a plate 117 carrying two porous plugs 118 and 119 similar to plugs 8 and 9 of Fig. 1. The chamber between diaphragm 114 and cap 115 forms the damping chamber 121'. The case 119' makes a fluid-tight seal with ring 115 and defines the chamber 121 between the cap 115 and 119'. The bore 122 communicates with terminal chamber 120 on the other side of the diaphragm by bore 123. The case 119' and bores 123 and 122 may be present or omitted as in Figs. 14 and 13, and the plugs may thus communicate with the atmosphere or other environment in which the unit is placed if the ambient pressure outside the chamber 121 and equal pressure, i.e. ambient pressure in case 101 is adequate, as will be more fully described below.

The oscillation of the mass 100 on the springs 110 transmitted to the diaphragm 114 causes an alternate compression and rarefication of the gas in chamber 121' to cause the gas to flow back and forth through the porous plugs 119 and 118 between chambers 121 and 121'. The maximum excursion of the mass 100 and the maximum change of volume in the damping chamber is fixed by fixing the stops 125 and 126.

The above and the following discussion applies as well to the form of Fig. 1 and Fig. 5, and the Equations 1—23 are equally applicable. In the form of Fig. 1, where the rod is connected at the center of mass, and in the form of Fig. 5, $L_1/L_2$ may be set equal to one, so simplifying the equations.

The following are definitions of the terms used in this specification. For purposes of illustration and explanation, the terms are exemplified by reference to the specific forms illustrated in the figures. However, as will be understood, the description and the equations are of general application to other forms of my invention:

Moment of inertia of mass 1 or 100 including attached masses of the rod and spring on which the masses are mounted ___________________________________ I
Diaphragm 7 or 114 physical area, exposed to chamber 14 or 121' ___________________________________ A
Effective area of diaphragm 7 or 114 exposed to chamber 14 or 121' ___________________________________ $A_e$
In a rigid diaphragm, such as a piston__________ $A_e=A$
Volume of chamber 14 or 121' with diaphragm 7 or 114 undeflected ___________________________________ $V_0$
Sum of the effective cross-sectional areas of plug 8 and 9 or 118 and 119 ___________________________________ $A_p$ For plugs of uniform cross-sectional areas such as is illustrated by the cylindrical plugs 8, 9, 118 and 119, the effective cross-sectional area of each plug is their actual cross-sectional area. Where the plugs are not of uniform cross-sectional area as in the case of solids of a shape generated by a line inclined to the axis or by a curve, the equivalent area is that of a cylinder of uniform cross-sectional area of the same length and formed of the same material which has the same total acoustic resistance as the plug of non-uniform cross-sectional area. Where more than one plug is employed, the total effective cross-sectional area $A_p$ is the sum of the effective areas of the system of plugs arranged for parallel flow as in the forms illustrated in the drawing.

Lengths of plugs 8 and 9 or 118 and 119 (the length of the plugs in each preferably being equal) i.e., the length of 8 is equal to 9 and the length of 118 is equal to 119 ___________________________________ $l$
The distance between the center of the rod 5 to the line of bending of the spring on which the mass 1 is mounted ___________________________________ $L_1$
The distance of the center of mass 4 to the line of bending of the spring ___________________________________ $L_2$
The force exerted on the system and which causes a displacement of the masses and the diaphragms 7 or 114 ___________________________________ F
The stiffness of the spring suspension of the masses 1 or 100 ___________________________________ $S_1$
The stiffness of the diaphragm 7 or 114 ___________________________________ $S_2$ Where the masses are not suspended on springs this stiffness may be taken as any constraint on the vibration of the mass, i.e., the proportionality constant which relates the force to the magnitude of the displacement of the vibrating mass. While I have specifically illustrated accelerometers, any form of device in which a vibrating mass may be connected to the damping diaphragm is included within this description and may be damped according to my invention.

I have discovered that with the foregoing critical relationships satisfied the plugs 8 and 9 act essentially as a pure resistance. Under those conditions the equation which represents the response $x$, i.e., deflection or amplitude of the vibration of the mass, for example 1 or 100, induced by an applied force F applied at any given frequency $\omega$ is $$F = \left[ \left\{ S_1 + \left(\frac{L_1}{L_2}\right)^2 S_2 \right\} - \frac{I}{L_2^2}\omega^2 + \frac{A_e^2}{A^2}\left(\frac{L_1}{L_2}\right)^2 \frac{\left(\frac{AR_1 l}{Ap}\right)^2 S_3}{\left\{\left(\frac{AR_1 l}{Ap}\right)^2 + \left(\frac{S_3}{A\omega}\right)^2\right\}} \right.$$
$$\left. + j\omega A_e^2 \left(\frac{L_1}{L_2}\right)^2 \frac{\left(\frac{S_3}{A\omega}\right)^2 \left(\frac{R_1 l}{A_p}\right)}{\left\{\left(\frac{AR_1 l}{Ap}\right)^2 + \left(\frac{S_3}{A\omega}\right)^2\right\}} \right] x \quad (5)$$

In this equation the symbol $S_3$ is used to represent the chamber stiffness, i.e., the ratio between the force applied to the diaphragm 7 or 114 with the plug 8 and 9 and also 118 and 119 sealed (so no gas flows through the plugs), to the displacement of the diaphragm 7 or 114 when this is taken as a rigid piston of area equal to the cross-sectional area of the chamber 14 or 121'. The value of $S_3$ is $$S_3 = \frac{A^2 p_0}{V_0} \quad (6)$$

if the compression is isothermal, or $$S_3 = \frac{A^2 \gamma p_0}{V_0} \quad (7)$$

if the compression is adiabatic. In these equations $\gamma$ is the ratio of specific heats of the gas, $p_0$ is the gas pressure in the damping chamber 14 or 121'', and plugs 8 and 9, or 118 and 119 when the diaphragm 7 or 114 is stationary in its central undeflected position.

As a matter of convenience, Equation 5 can be rewritten in terms of three dimensionless parameters $\epsilon$, $\eta$ and $\delta$ defined as follows:

$$\epsilon = \frac{\omega}{\omega_0} \quad (8)$$

where $\omega_0$ is the natural frequency of the oscillating mass 1 in radians per second and $\omega$ is the frequency at which the deflection X of the mass 1 and center of diaphragm 7 is measured.

$$\delta = \frac{\left(\frac{R_1 l \omega_0 A^2 e}{A p}\right)\left(\frac{L_1}{L_2}\right)^2}{2\left\{S_1 + \left(\frac{L_1}{L_2}\right)^2 S_2\right\}} \quad (9)$$

$$\eta = \frac{\frac{S_3}{A\omega_0}}{\frac{AR_1 l}{A_p}} = \frac{\rho_0 A_p}{V_0 R_1 l \omega_0} \quad (10)$$

In terms of these parameters the relative response $R_2$ of the devices, both Fig. 1 and Fig. 5, i.e., response at frequency $\omega$ divided by response at frequency zero or where the acceleration is unidirectional is $$R_2 = \left[1 - \epsilon^2 + (2\gamma\eta)\frac{\epsilon^2}{\eta^2 + \epsilon^2} + (j2\delta\eta^2)\frac{\epsilon}{\eta^2 + \epsilon^2}\right]^{-1} \quad (11)$$

Figure 11:
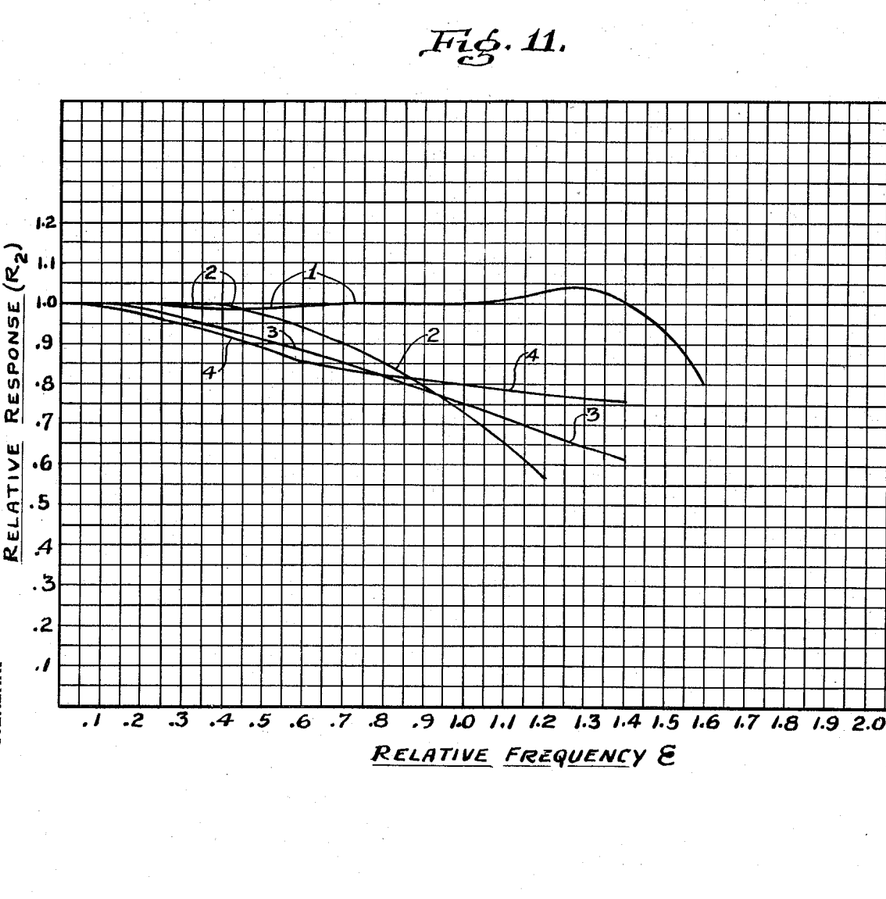
Fig. 11 is a chart showing the response characteristics of damped systems.

$R_2$ as a function of $\epsilon$ is ploted in Fig. 11 for various values of $\eta$ and $\delta$.

Thus it can be seen that the shape of a frequency response curve is uniquely determined by fixing values of the two parameters $\delta$ and $\eta$. The effect of the values of $\eta$ and $\delta$ on the frequency response curve of an instrument is illustrated in Fig. 11.

In Fig. 11 the curve indicated as 1 has a value of $\delta = 0.54$ and $\eta = 2$. These values are especially suitable for the damping of an accelerometer of the nature illustrated in the above figures. It will be seen that the relative response is flat and equal to unity up to a frequency equal to the natural frequency of the instrument, i.e., $\epsilon = 1$. In fact, the resonance peak is not material and the response is reasonably flat above the natural frequency and does not fall 10% until a frequency of about one and a half times the natural frequency is reached, i.e., up to $\epsilon = 1.5$.

This may be compared with the curve 2 which shows the response curve of a viscously damped device, such as an accelerometer operating at 0.7 times the critical damping, and which has always been considered the optimum attainable damping of vibrating masses. The improvement thus produced will be appreciated by those skilled in this art. The effect of the values of $\delta$ and $\eta$ on the shape of the response curve is further illustrated by curve 3 in which the value $\delta = 0.7$ and $\eta = 3$, and curve 4 in which $\delta = 0.7$ and $\eta = 2$.

It is one of the particular advantages of my discovery that by properly choosing the porous plug material for plugs 8, 9, 118 and 119 and their length, and by selecting the values of $\eta$ and $\delta$ as indicated above, I may obtain a substantially flat response curve, i.e., one in which the relative response is about one at all frequencies up to and even higher than the natural frequency of the system.

In order to design a damper with the desired values of $\eta$ and $\delta$ for a particular instrument, it is assumed that the constants of the instrument $S_1$, $S_2$, $L_1$, $L_2$, $A_e$ and $\omega_0$ are known in advance, since they may be obtained by conventional means. Substitution of these values in Equation 9 will give the value of $$\frac{R_1 l \omega_0}{A_p}$$

Let it be represented by $$\frac{R_1 l \omega_0}{A_p} = k_2 \quad (12)$$

where $$k_2 = \frac{2\delta\{S_1 + (L_1/L_2)^2 S_2\}}{A_e^2 \left(\frac{L_1}{L_2}\right)^2} \quad (12a)$$

Substitution of $k_2$ in Equation 10 gives $$\eta = \frac{\rho_0}{V_0 k_2} \quad (13)$$

Thus, for any given value of $\eta$ and $k_2$, the value of $p_0/V_0$ which will provide the necessary chamber stiffness is established. At this point the volume $V_0$ is chosen, then $p_0$ must be such as to give the required value of the ratio $p_0/V_0$. To complete the design it remains only to fix the size of the porous plug and its flow resistance. This I accomplish as follows:

The value of $p_0$ previously established can be substituted in Equations 3 and 4, at the same time setting $\omega = \omega_0$, thereby fixing the value of $\omega_0 R_1 l$. Let it be represented by $$\omega_0 R_1 l^2 = K \quad (14)$$

Then elimination of $\omega_0 R_1 l$ between Equations 12 and 14 gives $$l A_p = \frac{K}{k_2} \quad (15)$$

Thus I have discovered that by fixing the value of $\eta$ and $al$ within the above critical limits in dampers designed according to my invention, the required volume of plug material $lA_p$ can be calculated from the known constants of the instrument and is entirely independent of the specific resistance $R_1$ of the plug material.

A plug material having pores or holes of any size may be selected, subject only to the limitation expressed by Equation 2. Then it follows from Equation 12 that if the material is fine-grained, i.e., $R_1$ is large, the ratio $l/A_p$ must be relatively small. (Note that $k_2$ is a constant of the instrument fixed or known in advance.) That is to say, the plug will be short and wide. If the material is coarse, the plug will be longer and narrower. Since a plug, either long or extremely thin, is flimsy and hard to handle, it is desirable to choose a value of $R_1$ which will make the length and width of the plug about equal.

Since the product $al$ can have any value but preferably less than about 0.5 for plugs of uniform cross-sectional area, there is some latitude in the value of $l$ for any given plug material. This is convenient because it permits plugs to be cut from porous sheet material without the necessity either of stocking an excessive number of different thicknesses or of machining the front and back faces of the plug. Such a machining operation cannot be tolerated because of the risk of sealing the pores of the material. Materials suitable for my purposes are foraminated ceramic discs, fritted glass discs, compressed powder metal discs, and similar types of material of which many are available on the market as porous plugs, permeable to air under pressure but having sufficient structural rigidity to stand substantial gas pressures and mechanical handling.

While an acoustically damped transducer designed in accordance with my invention will be properly damped and have the desired frequency response characteristics, I have found that unless the effective volume of the damping chamber, for example 14 or 121', exceeds a certain critical lower limit, the instrument will exhibit severe nonlinearity. If the effective volume of the damping chamber does not exceed the critical lower limit, the excursion $x$, for example of the mass 1 or 101, on the application of a given force F, will not be directly proportional to F, as is desirable in transducers. The device will act as if it had a variable stiffness rather than a constant stiffness as is desirable for linear transducers. I have found that in order for a transducer to have linear characteristics throughout any desired value of the excursion $x$ of the transducer, it is necessary to choose the original value of $V_0$ such that the ratio of the maximum change in volume $\Delta V$ in the diaphragm chamber produced by the maximum displacement of the diaphragm to the original volume $V_0$, be substantially equal to the ratio of the resulting change in pressure $\Delta p$ in the diaphragm chamber to the original pressure $p_0$, i.e.

$$\frac{\Delta V}{V_0} = \frac{\Delta p}{p_0} \qquad (16)$$

One accepted standard of linearity is that the actual departure of a calibration curve of an instrument in which the deflection is plotted as a function of the applied force (i.e., the excursion of the mass 1 or 101 on application of various accelerating forces) should not depart from a straight line drawn through 0 and the permissible full scale deflection of the transducer (e.g., the maximum permissible deflection of the mass 1 or 100) by an amount greater than 1% of the full scale deflection. If such a transducer is defined as a linear transducer, one which will depart largely from this curve to give greater variations would not be considered to be linear. This means that the transducer must act as if it had a substantially constant mechanical stiffness (within the above limits of variation) at all applied forces up to the permissible maximum.

By fixing the permissible variation in stiffness to obtain the degree of linearity required, and establishing the maximum excursion of the transducer resulting in the maximum change in volume $\Delta V$, which is produced by the diaphragm, I may, by adjusting the value of $V_0$ obtain the compression ratio $\Delta V/V_0$, which will give a stiffness variation within the limits of linearity chosen. Ordinarily, it will be found that the excursion of the diaphragm is definitely fixed by the requirements of the vibrating system to be damped. This condition, in the systems of my invention, sets a lower limit to the volume of the chamber which is practicable and desirable for efficient damping and to produce linearity, as described above.

The smaller the fraction of volume change the more linear will be the transducer in the range of the excursion, resulting in this change in volume. If the plug be considered to be sealed, i.e., covered, so no gas flows therethrough, I have found that an acceptable linearity is obtained if the compression ratio is kept below a critical upper limit, which I have found to be 1/18. If the plug is open so that gas escapes through the plug into the atmosphere or a terminal chamber, such as 120 or 14', in which the volume is so large that the pressure may be considered substantially constant notwithstanding the flow of gas through the plugs, I have found that a smaller volume can be used than that stated above. In mathematical terms the condition becomes $$\frac{\Delta V}{V_0} \frac{\epsilon}{\sqrt{\eta^2 + \epsilon^2}} \leq \frac{1}{18} \qquad (17)$$

$$V_0 \geq \frac{18 \Delta V \epsilon}{\sqrt{\eta^2 + \epsilon^2}} \qquad (17a)$$

where $\epsilon$ and $\eta$ are as previously defined. Thus the reduction in volume permissible depends on the frequency. If conditions are defined in terms of performance at the natural frequency, $\epsilon$ can be set equal to 1. Further, for purposes of illustration and not as restricting the scope of the invention, assume it is determined to design a transducer such as in curves 1 and 4 Fig. 11, employing any curve with $\eta$ equal to 2, then Equation 17 becomes $$\frac{\Delta V}{V_0} \leq \frac{1}{8} \qquad (18)$$

Figures 9, 10:
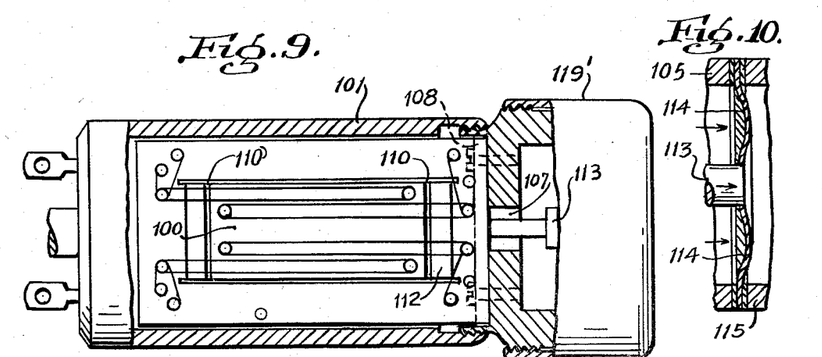
Fig. 9 is a section on line 9—9 of Fig. 5.
Fig. 10 is a schematic illustrating one principle employed in my invention.

In Equation 18 if the diaphragm were not opposed by the excess pressure $\Delta p$ in the diaphragm chamber resulting from the reduction in volume occasioned by the motion of the diaphragm, the volumetric displacement would simply be $\Delta V = A_e x$ where $x$ is the motion at the center of the diaphragm, which is also the definition of $A_e$. However, in a flexible diaphragm the pressure actually causes the diaphragm to bulge backwards so as to reduce the volume of gas displaced (see Fig. 10) by an amount illustrated by the cross-hatched portion on Fig. 10, where the pressure on the diaphragm is in the direction of the arrow. So far as the magnitude of the excess pressure is concerned, the effect is as though the volumetric displacement were still $A_e x$ but the volume of the chamber was increased to the value $V_0 + k_3 p_0$. With this modification Equation 18 becomes $$\frac{A_e x}{V_0 + k_3 p_0} \leq \frac{1}{8} \qquad (19)$$

In this equation $k_3$ is the "bulge volume" per unit pressure (see Fig. 10), measured with the center of the diaphragm held motionless while the pressure is applied. The bulge volume is the volume between the undeflected diaphragm and the bulged diaphragm when pressure is applied to the diaphragm and the center of the diaphragm is held immovable and constitutes the increase in volume of the chamber which is obtained when the center of the diaphragm is held against displacement and the pressure is applied.

The quantity $V_0 + k_3 p_0$ can be called the "effective volume" of the chamber, and the above relationship (Equation 19) gives the volume necessary for any given diaphragm and pressure in the chamber in order that the transducer be linear (within the limits chosen) throughout the maximum value of the excursion $x$ chosen for the instrument, i.e., its maximum scale deflection.

Returning now to the question of chamber design, substituting the effective chamber volume derived above for the value $V_0$ in Equation 13, we obtain $$p_0 = \frac{V_0 \eta k_2}{1 - k_3 \eta k_2} \qquad (20)$$

In the case of Equation 20–A, $\eta$ has the value $$\eta = \frac{p_0}{(V_0 + k_3 p_0) k_2} \qquad (20\text{-}A)$$

In Equation 20–A the effective volume $V_0 + k_3 p_0$ is employed in Equation 13. In Equation 13, $k_3$ is equal to zero.

Thus, it appears that the larger $k_3$ becomes (i.e., the more readily the diaphragm bulges), the smaller the denominator in Equation 20 becomes, and the greater $p_0$ must be. For a rigid diaphragm, such as a piston where $A_e = A$, $k_3$ is equal to zero.

A critical requirement for dampers designed according to my invention is the use of a diaphragm so constructed that $$k_3 < \frac{1}{\eta k_2} \qquad (21)$$

and preferably it is desirable to have $$k_3 < \frac{1}{2 \eta k_2} \qquad (22)$$

However, in order that the transducer be capable of being acoustically damped, I have found that another critical relationship must be satisfied.

If $k_3$ is sufficiently small I may use the smallest effective volume consistent with the required degree of linearity, as previously set forth, for example, the smallest effective volume permitted by Equation 19, then $$V_0 + k_3 p_0 = 8 A_e x$$

Substitution of this in Equation 20 gives $$p_0 \geq 8 A_e x \eta k_2 \qquad (23)$$

It is a feature of my invention that the initial gas pressure in the damping chamber and plug have at least the magnitude given by value of $8 A_e x \eta k_2$ (Equation 23) of the expression in order to achieve the desired degree of damping as set forth in the preceding specification.

If it is desired to employ a device whose degree of linearity permits a greater departure than 1% of full scale deflection as aforesaid, the effective volume may be correspondingly increased and if it is desired to depart from the above degree of damping, the lower limit of the pressure may be neither more or less than $8A_e x \eta k_2$ depending on whether a greater or less degree of damping than as stated above, is desired as will be understood from the foregoing. The required pressure in the diaphragm chamber may be atmospheric, less than atmospheric, or greater than atmospheric depending on the parameters of the mechanical system to be damped. In the claims the following letters and symbols have the meanings as given to them in the herein specification and are herewith tabulated for convenience:

$a$ is the attenuation constant of the porous plug in c.g.s. units $l$ is the length of the plug in centimeters $R_1$ is the specific flow resistance per unit length of the plug $\rho_0$ is the density of the gas in the unit $k$ is the structure factor of the plug material $\omega$ is the angular frequency of vibration of the mass $\omega_0$ is the angular natural frequency of the oscillating suspended mass $\epsilon$ is the ratio of $\omega$ to $\omega_0$ as given in Equation 8

$\eta$ is a dimensionless parameter having a value as given by Equation 10 and is also given by Equation 13 when $k_3$ is zero or by Equation 20–A for all values of $k_3$ $R_2$ is the relative response as given by Equation 11

$V_0$ is the volume of the damping chamber with the diaphragm undeflected $k_2$ is the ratio given by Equation 12a, see also Equation 13

$k_3$ is the bulge volume per unit pressure measured with the center of the diaphragm held motionless while the pressure is applied $p_0$ is the original pressure in the chamber where its volume is $V_0$ $A_p$ is the sum of the effective cross sectional areas of the porous plugs $A_e$ is the effective area of the diaphragm $x$ is the maximum displacement of the mass obtained in vibration of the mass.

While I have described a particular embodiment of my invention for the purpose of illustration, it should be understood that various modifications and adaptations thereof may be made within the spirit of the invention as set forth in the appended claims.

I claim:

1. An acoustically damped inertial system comprising a mass mounted for oscillatory movement, a gas-filled closed damping chamber, a diaphragm in said chamber, a compressible gas in said chamber, a motion transmitting connection between said diaphragm and said mass, a gas discharging passageway from said chamber, a porous plug of uniform cross-sectional area in said passageway, whereby on motion of said mass, said diaphragm is moved in response thereto, to cause movement of the gas through said porous plugs, said damping chamber and porous plugs having the following parameters: the value of the product of the attenuation constant of the porous plug material $a$, and the length of the plug in the direction of the flow of the gas $l$ being less than 1.5 and greater than zero when the above parameters $a$ and $l$ are given in c.g.s. units, the specific flow resistance $R_1$ of the plug per unit length being greater than the product of the density of the gas in the plug $\rho_0$ multiplied by the structure factor $k$ of the material of the plug, and by the angular frequency of vibration $\omega$ of the mass.

2. In the device of claim 1, where the product $al$ equals not more than 0.3.

3. In the device of claim 2, where the ratio of the value of $R_1$ to the product $\rho_0 k \omega$ is at least 5.

4. In the device of claim 2, in which the volume of the damping chamber with the diaphragm undeflected is not less than 18 times the product of the maximum change in volume in the damping chamber produced on vibration of the mass and diaphragm at the frequency of vibration of the mass multiplied by the value of the fraction $$\frac{\epsilon}{\sqrt{\eta^2 + \epsilon^2}}$$

5. In the device of claim 4, in which the diaphragm is a flexible diaphragm and in which the said volume of the chamber with the diaphragm undeflected is the effective volume of the chamber.

6. In the device of claim 5 in which the pressure on the damping chamber is not less than $8A_e x \eta k_2$ when $x$ is the maximum displacement of the mass obtained on vibration of the mass and $A_e$ is the effective area of the diaphragm.

7. In the device of claim 2, in which the volume of the damping chamber with the diaphragm undeflected is at least equal to eight times the maximum change in volume occurring in the damping chamber on the vibration of the mass to be damped.

8. In the device of claim 7, in which the diaphragm is a flexible diaphragm, and in which the volume of the chamber with the diaphragm undeflected is the effective volume of the chamber.

9. In the device of claim 8 in which the pressure in the damping chamber is not less than $8A_e x \eta k_2$.

10. In the device of claim 7 in which the diaphragm is a flexible diaphragm and the pressure in the damping chamber is at least equal to the fraction $$\frac{V_0 \eta k_2}{1 - k_3 \eta k_2}$$

in which $k_3 \eta k_2$ is less than one.

11. An acoustically damped inertial system comprising a mass mounted for oscillation, a gas-filled closed damping chamber, a diaphragm in said chamber, a mechanical motion transmitting connection between said diaphragm and said mass, a gas discharge passageway from said chamber, a porous plug in said passageway, whereby on oscillation of said mass, said diaphragm is moved in response thereto to cause movement of the gas through said porous plug, said diaphragm being flexible, and the pressure in said chamber being at least equal to $$\frac{V_0 \eta k_2}{1 - k_3 \eta k_2}$$

where $V_0$ is the volume of the damping chamber when said diaphragm is undeflected by said mass and $k_3$ is the bulge volume per unit pressure and $\eta$ is the ratio $$\frac{p_0}{(V_0 + k_3 p_0) k_2}$$

where $p_0$ is the pressure in the damping chamber when the volume is $V_0$ and $A_p$ is the total effective cross-sectional area of the plug and $R_1$ is the specific flow resistance of the plug and $l$ is the length of the plug and $\omega_0$ is the natural frequency of vibration of the mass and $k_2$ is the ratio $$\frac{R_1 l \omega_0}{A_p}$$

and in which device the relative response $R_2$ is not less than about unity at values $\epsilon$ up to about 1.

12. In the device of claim 11 in which the pressure in the damping chamber is not less than $8A_e x \eta k_2$ when $x$ is the maximum displacement of the mass obtained on vibration of the mass and $A_e$ is the effective area of the diaphragm.

13. In the device of claim 12 in which the effective volume of the damping chamber is equal to at least $8A_e x$.

14. In the system of claim 11, wherein the bulge volume per unit pressure of the diaphragm is less than the reciprocal of $\eta k_2$.

15. In the device of claim 14 in which the pressure in the damping chamber is not less than $8A_e x \eta k_2$ when $x$ is the maximum displacement of the mass obtained on vibration of the mass and $A_e$ is the effective area of the diaphragm.

16. In the device of claim 15 in which the effective volume of the damping chamber is equal to at least $8A_e x$.

17. In the system of claim 11, wherein the bulge volume per unit pressure of the diaphragm is less than the reciprocal of $2\eta k_2$.

18. In the device of claim 17 in which the pressure in the damping chamber is not less than $8A_e x \eta k_2$.

19. In the device of claim 18 in which the effective volume of the damping chamber is equal to at least $8A_e x$.

20. An acoustically damped inertial system comprising a mass subject mounted for oscillation, a gas-filled closed damping chamber, a diaphragm in said chamber, a mechanical motion transmitting connection between said diaphragm and said mass, a gas discharge passageway from said chamber, a porous plug in said passageway, whereby on vibration of said mass said diaphragm is moved in response thereto to cause movement of the gas through said porous plug, said diaphragm being flexible and having the characteristic that its bulge volume per unit pressure of the diaphragm is less than the reciprocal of $2\eta k_2$.

21. In the device of claim 20 in which the pressure in the damping chamber is not less than $8A_e x \eta k_2$.

22. In the device of claim 21 in which the effective volume of the damping chamber is equal to at least $8A_e x$.

23. An acoustically damped inertial system comprising a mass mounted for oscillation, a gas-filled closed damping chamber, a diaphragm in said chamber, a mechanical motion transmitting connection between said diaphragm and said mass, a gas discharge passageway from said chamber, a porous plug in said passageway, whereby on vibration of said mass said diaphragm is moved in response thereto to cause movement of the gas through said porous plug, said diaphragm being flexible, the volume of damping chamber with the diaphragm undeflected being not less than 18 times the product of the maximum change in volume in the damping chamber produced on oscillation of the mass and diaphragm at the frequency of oscillation of the mass multiplied by the value of the fraction $$\frac{\epsilon}{\sqrt{\eta^2 + \epsilon^2}}$$

where $\epsilon$ is the ratio of the frequency of oscillation to the natural frequency of the system.

24. In the device of claim 23 in which the pressure in the damping chamber is not less than $8A_e x \eta k_2$.

25. In the device of claim 24 in which the effective volume of the damping chamber is equal to at least $8A_e x$.

26. In the device of claim 1, in which the diaphragm is a flexible diaphragm and the pressure in the damping chamber is at least equal to the fraction $$\frac{V_0 \eta k_2}{1 - k_3 \eta k_2}$$

in which $k_3 \eta k_2$ is less than one.

27. In the device of claim 26 in which $k_3 \eta k_2$ is less than one half.

28. An acoustically damped inertial system comprising a mass mounted for oscillatory movement, a gas-filled damping chamber, a diaphragm in said chamber, a compressible gas in said chamber, a motion transmitting connection between said mass and said diaphragm a passageway connecting the damping chamber with the exterior of said damping chamber, a porous plug in said passageway, whereby on motion of said mass, said diaphragm is moved in response thereto, to cause movement of gas through said porous plug, the acoustic reactance of said plug being substantially less than the acoustic resistance of said plug.

29. In the device of claim 28 the said acoustic reactance being less than 20% of the said acoustic resistance.

30. An acoustic device which comprises a mass mounted for vibration, a compartment, an enclosing wall for said compartment, spaced walls in said compartment separating said compartment into three chambers, one of said walls being a diaphragm having opposite faces, a motion transmitting connection between said mass and said diaphragm, one of said faces of said diaphragm facing one of said walls of one of said chambers, the space between said diaphragm and said facing wall defining a damping chamber, a porous plug in one of said walls connecting said damping chamber and one of said other chambers and a fluid bypass connection connecting the two chambers other than the damping chamber and a gas in said chambers.

31. An acoustically damped inertial system, a case, a mass mounted for vibration in said case, a diaphragm, a motion transmitting connection between said diaphragm and said mass, a fluid passageway between the interior of said case and one side of said diaphragm, an enclosed acoustic damping chamber, said diaphragm being positioned with the opposite side of said diaphragm in fluid communication with said damping chamber, a second chamber, a fluid passageway between said damping chamber and said second chamber, a porous plug in said fluid passageway and a bypass passageway connection between said second chamber and said case and a gas in said chambers.

32. An acoustically damped inertial system comprising a mass mounted for vibration, an acoustic damping chamber, an enclosing wall for said chamber, a diaphragm mounted in said chamber, said wall and said diaphragm enclosing an enclosed damping chamber, a port connecting the interior of said enclosed damping chamber with the exterior of said chamber, a motion transmitting connection between said mass and said diaphragm, and a porous plug in said port, a gas in said chamber, a case enclosing said mass and means for maintaining the pressure in said diaphragm chamber, with the mass motionless, at a pressure greater than the ambient pressure outside said case.

33. An acoustically damped inertial system comprising a mass mounted for oscillation, a gas-filled closed damping chamber, a diaphragm in said chamber, a mechanical motion transmitting connection between said diaphragm and said mass, a gas discharge passageway from said chamber, a porous plug in said passageway, whereby on oscillation of said mass, said diaphragm is moved in response thereto to cause movement of gas through said porous plug, said diaphragm being flexible, and the pressure in said chamber being at least equal to $$\frac{V_0 \eta k_2}{1 - k_3 \eta k_2}$$

where $\eta$ has a value within the range of approximately 2 to approximately 3.

34. In the system of claim 33 wherein $k_3$ is less than the reciprocal of $\eta k_2$.

35. In the system of claim 33 wherein $k_3$ is less than the reciprocal of $2\eta k$.

References Cited in the file of this patent

UNITED STATES PATENTS

| | | |
|---|---|---|
| 2,317,028 | Chappell et al. | Apr. 20, 1948 |
| 2,440,605 | Hathaway | Apr. 27, 1948 |
| 2,515,394 | Clarkson | July 18, 1950 |
| 2,776,829 | Cockram | Jan. 8, 1957 |

UNITED STATES PATENT OFFICE
Certificate of Correction

Patent No. 2,909,364                                                       October 20, 1959

Cecil K. Stedman

It is hereby certified that error appears in the printed specification of the above numbered patent requiring correction and that the said Letters Patent should read as corrected below.

Column 2, line 62, for the arabic number "2" read —(2)—; column 6, line 48, in the formula, after the closing bracket, for the last symbol shown as "$x$" read —$\chi$—; line 68, for "121'''" read —121'—; column 7, line 3, for the symbol shown as "X" read —$\chi$—; line 20, for that portion of Formula (11) reading "$\gamma$" read —$\delta$—; column 8, line 29, before "resistance" insert —flow—; column 10, line 9, Formula (19), for the symbol "$x$" read —$\chi$—; column 11, line 2, for "neither" read —either—.

Signed and sealed this 6th day of September 1960.

[SEAL]

Attest:
ERNEST W. SWIDER,
*Attesting Officer.*                                                      ROBERT C. WATSON,
*Commissioner of Patents.*